United States Patent

[11] 3,583,290

| [72] | Inventors | Southwick W. Briggs<br>6420 Western Ave., Chevy Chase, Md. 20015;<br>William A. Brazerol, 2115 31st Place S.E., Washington, D.C. 20020 |
|---|---|---|
| [21] | Appl. No. | 848,590 |
| [22] | Filed | Aug. 8, 1969 |
| [45] | Patented | June 8, 1971 |

[54] INTERNAL COMBUSTION ENGINE AND METHOD OF COATING THE COMBUSTION CHAMBER THEREOF
16 Claims, 4 Drawing Figs.

[52] U.S. Cl. .................................................. 92/169, 29/194, 29/197, 29/199
[51] Int. Cl. ........................................... F01b 31/08, F16l 59/12
[50] Field of Search .......................................... 92/169–171; 29/199, 194, 197, 106 (Inquired), 117 (Inquired), 75 (Inquired)

[56] References Cited

UNITED STATES PATENTS

| 2,025,020 | 12/1935 | Russell et al. | 29/197 |
| 3,141,744 | 7/1964 | Couch | 29/197 |
| 3,330,633 | 7/1967 | Joseph et al. | 29/197 |

FOREIGN PATENTS

| 568,589 | 4/1945 | Great Britain | 92/169 |

*Primary Examiner*—Martin P. Schwadron
*Assistant Examiner*—Allen M. Ostrager
*Attorney*—Mason, Kolehmainen, Rathburn and Wyss

ABSTRACT: An internal combustion engine and a method of coating a combustion chamber wall surface therein comprising the steps of preheating the base metal forming the wall surface to at least 500° F. and fusion bonding a base layer of nickel and aluminum to the preheated base metal for retarding conductive heat transfer through the wall surface. An intermediate layer comprising nickel, aluminum, and copper is applied over the base layer and an outer layer of copper for reflecting infrared heat is applied over the intermediate layer, which helps to mechanically bond the base layer and outer layer together.

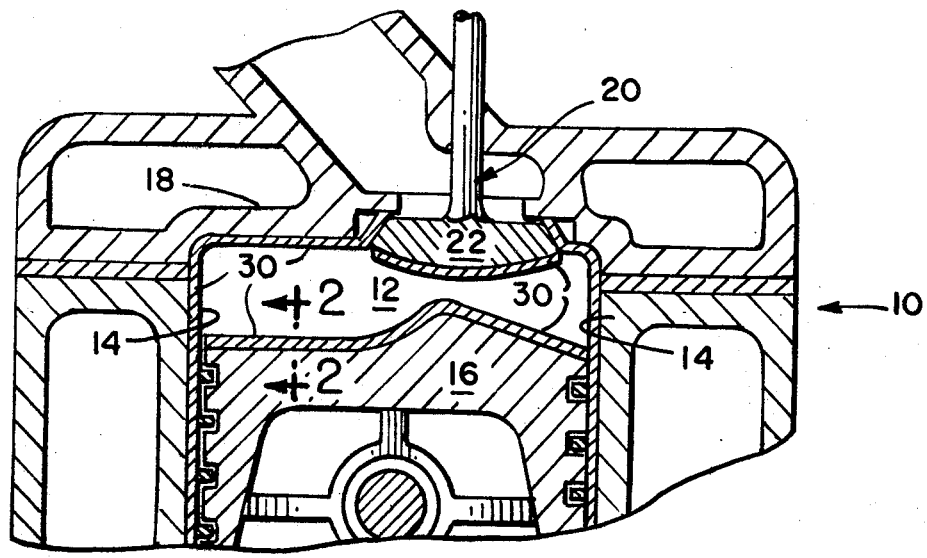

PATENTED JUN 8 1971

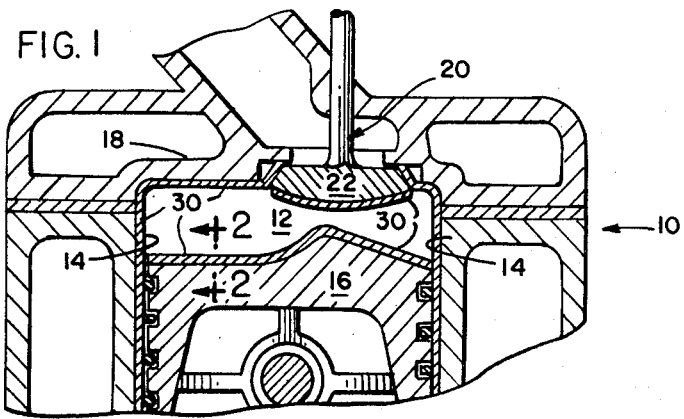

FIG. 2

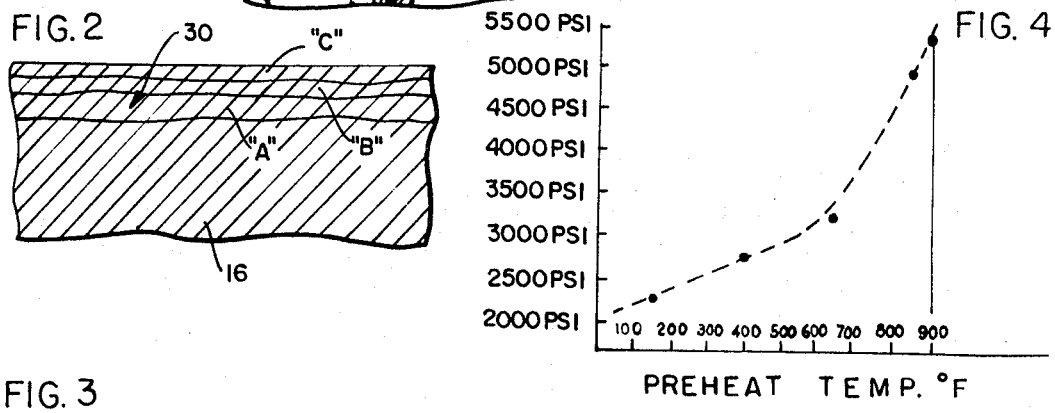

| COATING BOND STRENGTH IN PSI | TYPE OF COATINGS | | | |
|---|---|---|---|---|
| | LAYERS AND THICKNESS OF APPLICATION | | | |
| | TWO LAYER SAMPLE | THREE LAYER SAMPLE #1 | THREE LAYER SAMPLE #2 | THREE LAYER SAMPLE #3 |
| | "A" .005" 95% Ni +5% Al  "C" .005" 100% Cu | "A" .005" 95% Ni +5% Al  "B" .005" {15%(95% Ni+5% Al) / 85% Cu}  "C" .005" 100% Cu | "A" .005" 95% Ni +5% Al  "B" .005" {40%(95 Ni+5% Al) / 60% Cu}  "C" .005" 100% Cu | "A" .005" 95% Ni +5% Al  "B" .005" {50%(95% Ni+5% Al) / 50% Cu}  "C" .005" 100% Cu |
| | 1645 | 1725 | 2230 | 1760 |
| | 1160 | 1560 | 2060 | 1900 |
| | 1340 | 1640 | 2380 | 1840 |
| | 1460 | 1670 | 1880 | 1930 |

INVENTORS:
SOUTHWICK W. BRIGGS
WILLIAM A. BRAZEROL

BY: *Mason, Kolehmainen, Rathburn & Wyss*
ATT'YS

INTERNAL COMBUSTION ENGINE AND METHOD OF COATING THE COMBUSTION CHAMBER THEREOF

The present invention is directed to a new and improved internal combustion engine having a combustion chamber wall surface covered with a heat insulating coating of high mechanical strength and a method of applying the coating to the wall surface, and is related to the invention shown and described in copending U.S. Pat. application Ser. No. 801,124, filed Feb. 20, 1969.

In the past, various types of coatings have been applied to combustion chamber wall surfaces of internal combustion engines in order to improve engine efficiency and performance by reducing the heat losses from the hot gases in the combustion chamber. In many instances, such coating materials were effective to reduce a portion of the heat losses radiated in the form of infrared energy but were relatively inefficient in reducing heat losses flowing through the walls via a conductive heat flow process. The coating material and method of applying the coating, as described in the aforementioned copending patent application, were a big step forward in providing an improved combustion chamber surface coating, and the present invention provides a further improvement or refinement in the art of producing a heat insulating coating of high mechanical strength and especially well suited for use in an internal combustion engine. The improved coating and process of the invention provide a low friction surface which is able to withstand, for long periods of time, the high mechanical stresses caused by abrasion and heat normally developed in an internal combustion engine. Because of the continuously fluctuating and relatively high temperatures and pressures present in an engine, physical failure of combustion chamber surface coatings is an ever present problem. The present invention provides a coating with greatly improved physical characteristics, as far as wear and engine life are concerned, in addition to excellent heat insulating characteristics.

The present invention has for an object the provision of a new and improved internal combustion engine with a combustion chamber wall surface having a new and improved coating thereon which is highly effective in reflecting infrared heat radiation and retarding conductive heat flow through the cylinder walls, and in addition the coating has improved mechanical and thermal stress resistant characteristics for better withstanding mechanical and temperature induced stresses and frictional wear.

Another object of the present invention is to provide a new and improved multilayer coating for a combustion chamber wall surface of an internal combustion engine, said coating having wear and strength characteristics much higher than prior art coatings.

Another object of the present invention is to provide a new and improved coating method for improving the heat insulating characteristics of the wall surfaces in a combustion chamber of an internal combustion engine.

Still another object of the present invention is to provide a new and improved method of applying a multilayer coating on the surfaces of an internal combustion engine, which method includes fusion bonding of the several layers to one another and the base metal of the engine.

Still another object of the present invention is to provide a new and improved method of coating a combustion chamber wall surface of an internal combustion engine to provide higher engine efficiencies for a longer period between recoating intervals.

Yet another object of the present invention is to provide a new and improved multilayer coating with better mechanical bonding of the several layers and better bonding of the coating to the walls of the combustion chamber of an internal combustion engine.

The foregoing and other objects and advantages of the present invention are accomplished by a new and improved method of applying a multilayer, heat reflective coating to combustion chamber wall surfaces of internal combustion engines comprising the steps of preheating and maintaining the base metal forming said wall surfaces to a temperature of at least 500° F., and fusion bonding a base layer of nickel and aluminum onto the preheated base metal. An intermediate layer comprising nickel, aluminum and copper is fusion bonded to the base layer, and an outer layer of copper is fusion bonded onto the intermediate layers. The three layers making up the coating are mechanically and chemically bonded together forming a strong and tough heat insulating coating. The base layer of the coating provides an extremely effective barrier resisting the flow of heat by conduction through the combustion chamber wall surfaces and the outer layer of the coating provides an excellent means of reflecting infrared heat radiation back to the bases in the combustion chamber. The intermediate layer structurally bonds the base layer and outer layer together so that, overall, the multilayer coating is heat and wear resistant and results in increased engine operating efficiency.

For a better understanding of the present invention reference should be had to the accompanying drawings, in which:

FIG. 1 is a fragmentary sectional elevational view depicting the invention as applied to the combustion chamber of a typical internal combustion engine;

FIG. 2 is a greatly enlarged fragmentary sectional view taken substantially along line 2-2 of FIG. 1, illustrating a multilayer coating of the present invention applied to the head of a piston of the engine of FIG. 1, with several layers of the coating shown in greatly exaggerated thickness to better illustrate the features of the invention.

FIG. 3 is a graphical representation illustrating comparative test results of a prior art coating and several types of three-layer coatings, in accordance with the present invention; and FIG. 4 is a graphical representation illustrating the relation of the tensile strength of the coating to the preheat temperature of the base metal during application of the coating.

Briefly, the present invention is concerned with a multilayer coating applied to combustion chamber wall surfaces in an internal combustion engine. The coated surfaces of the chamber, for example, might normally include the heat of the piston, the cylinder walls, the head of the valves, and the underside of the engine head itself. The multilayer coating of the present invention includes an outer layer highly reflective of heat radiation in the infrared range, and in addition includes intermediate and base layers which provide insulation for resisting the transfer of heat from the combustion gases through the walls of the combustion chamber via direct heat conduction.

In accordance with the present invention an internal combustion engine 10 (FIG. 1) includes one or more combustion chambers 12 defined by the sidewalls of a cylinder 14, the upper surface of the head of a piston 16, and the lower surface of a cylinder head structure 18. The cylinder head structure 18 provides passage for the intake and exhaust of gases to and from the combustion chamber 12 and in order to open and close the passages, a pair of valves, such as the intake valve 20, having an enlarged head surface 22, is provided. In many internal combustion engines, the base metal used in casting the cylinder wall structure 14 in the engine block, the cylinder head structure 18, and the pistons 16 may comprise an aluminum alloy, cast iron or steel, or other types of alloy steels.

In accordance with the present invention, the wall surfaces defining the combustion chamber 12 are provide with a multilayer, heat reflective coating, generally indicated as 30, and shown in greatly exaggerated thickness in FIG. 2. As shown in FIG. 1, the coating 30 is applied to the walls of the cylinder 14, the upper surface on the head of the piston 16, the lower surface of the enlarged valve heads 22, and the undersurface of the cylinder head structure 18 above the piston head. Because the coating material 30 on these surfaces is capable of reflecting a high percentage of the energy developed in the combustion chamber gases in the infrared heat range and, additionally, serves as an effective insulating barrier for minimizing the escape of heat from the combustion gases through the cylinder wall structure of the engine, the engine 10 operates with improved economy and higher power output than possible with an identical engine not having the coating 30 on the combustion chamber wall surfaces in accordance with the present invention.

It has been found that the coating 30 applied in accordance with the principles of the present invention, as described in greater detail hereinafter, is effective to reflect approximately 80 percent or more of the infrared heat radiation having a wavelength in the range between 7/10 and 10 microns and, in addition, is effective to greatly reduce conductive heat losses through the wall structure of the combustion chamber. Because the coating 30 applied on the wall surfaces of the combustion chamber 12 is subject to extremely high and rapidly changing and repeated temperatures and pressures, the coating must be able to withstand repeated and high mechanical stresses. Moreover, the coating should have a low coefficient of friction and be readily machinable. In the past, many different coating materials have been tested and tried, and although sometimes effective in reducing engine heat losses, oftentimes the coatings were of little practical value because of early mechanical failures.

As shown in exaggerated form in FIG. 2, the coating 30 applied to the upper head surface of the piston 16 comprises a base layer "A" composed of a mixture of 95 percent nickel and 5 percent aluminum, and the base layer "A" is applied directly onto the base metal of the piston head in a flame spraying process. The flame spraying process usually comprises several passes over the surface to provide a layer approximately 0.002 to 0.005 inch in thickness. An intermediate layer "B" is then applied over the base layer "A" and the intermediate or second layer is composed of a mixture of one part consisting of 95 percent nickel and 5 percent aluminum and another part consisting of copper. The exact percentages of the two parts may be varied somewhat and, as shown in the graphical presentation in FIG. 3, has an effect on the bond strength of the finished coating 30. The intermediate layer "B" is also applied over the base layer "A" in a flame spraying process in several passes until the desired thickness of approximately 0.005 to 0.008 inch is obtained. An outer coating "C" of copper is then applied over the intermediate layer "B" in a flame spraying process in several passes until a thickness of approximately 0.002 to 0.008 inch is obtained. The overall thickness of the complete three-layer coating 30 is approximately 0.010 to 0.020 inch; however, as will be described more fully hereinafter, the layers "A," "B," and "C" are fusion bonded together both mechanically and chemically, and total thicknesses in the range 0.010 to 0.020 inch are effective. When the coating 30 is closely examined under an electron microscope, the layers blend into one another so that no exact or truly accurate thickness measurement for each individual layer is possible.

In accordance with the present invention, it has been found that a much higher mechanical strength and lower friction coefficient for the coating is achieved when the base metal to which the coating is applied is preheated to temperatures ranging above 500° F. In FIG. 4 is shown a graph for two types of piston materials (aluminum and steel) which indicates the effect of preheat temperature on the tensile failure stress of a coating 30. It was heretofore believed that the base metal surface on which a coating is applied by a flame spraying method could not be elevated over about 150° F. However, in the present invention, it has been found that by preheating and maintaining the base metal at a temperature ranging above approximately 500° F., a substantial increase in tensile strength and wear resistance characteristics of the coating is achieved. The graph shown in FIG. 4 bears this fact out. It is believed that by maintaining the base metal at an elevated temperature, sometimes as high as 1000° F. during the coating process, the individual molecules of the flame sprayed metal completely bond in mechanical and chemical fusion with the molecules of the base metal or the molecules of the previous layer of the coating.

In prior art coating processes which utilized copper as an infrared heat reflective outer layer, much difficulty was experienced in obtaining a good mechanical bond between the outer layer of copper and the base layer of nickel and aluminum. Oftentimes after only a short period of operation, the outer layer of copper would begin to spawl off or peel away. By providing for preheat and maintenance of elevated temperatures as the several layers of coating are being applied, good fusion bonding is obtained and the intermediate layer "B" is believed to better alloy together and provide much better bonding between the outer layer "C" and the base layer "A." It is believed that the intermediate layer "B" is effective as an adhesive agent in establishing a much better mechanical and chemical bond between layers "A" and "C" and that complete fusion between all of the several layers and the base metal is ultimately achieved. After the outer layer "C" of copper has been applied and while the coating 30 is still at an elevated temperature at or above approximately 500° F., the part is heat treated by quenching, preferably in water as the quenching medium. It is believed that the quenching makes the coating 30 more ductile and resistant to mechanical wear. The rapid cooling caused by the water quench does not appear to make the coating brittle but instead is believed to form a strong crystalline lattice structure which blends the molecules of the several layers and the outer layer of base metal into a uniquely strong coating having high mechanical strength and excellent heat insulating characteristics. In accordance with the method of the present invention the base metal part or portion which forms a combustion chamber wall surface is preheated and maintained at a temperature above approximately 500° F. and the base layer "A," composed of 95 percent nickel and 5 percent aluminum, is applied in a flame spraying operation. In a typical engine having an aluminum piston, the piston was preheated and maintained at a temperature of 680° F. and base layer "A" was applied thereto by two consecutive passes of the flame spraying apparatus with the tip of the nozzle maintained approximately 8 to 9 inches from the head surface. During the application process, the temperature of the powdered particles of aluminum and nickel being sprayed onto the piston surface is believed to be in the range of 1100° F. to 2700° F. or more, and the piston itself is maintained at a temperature range of 600° F. to 650° F. The same temperature range was maintained during application of the intermediate and outer layers "B" and "C." The layer "A" was applied in two passes of the flame across the piston with only oxygen and acetylene being supplied to the flame. The intermediate or bonding layer "B" was applied in four passes of flame spray across the workpiece, and the material sprayed consisted of a mixture of 40 percent of one part composed of aluminum and nickel in the ratio of 5 percent to 95 percent, respectively, and 60 percent of a second part composed of copper granules. The outer (infrared heat reflective) layer "C" of copper was applied in two passes of the flame spray and the total thickness of the coating, consisting of the three layers "A," "B," and "C" was approximately 0.014 inch. After the final flame pass for application of the outer layer "C," the piston was quenched in water. In all of the layers applied, the metal used in the flame spraying process was in a powered form. The tip of the flame spraying nozzle was maintained approximately 8 to 9 inches away from the surface on which the coating was applied.

FIG. 3 illustrates graphically the improvement in bond strength of a three-layer coating in accordance with the present invention as compared to a two-layer coating consisting of a base layer of nickel-aluminum and an outer layer of copper, each 0.005 inch in thickness. It should be noted that the bond strengths are all below 1700 in the two-layer coating, whereas in the three-layer coatings, in accordance with the invention, the bond strengths are considerably higher. It should be noted that in all samples tested the base layers "A" and outer layers "C" are identical in thickness and material. This stresses the importance of the intermediate layer "B" and the makeup thereof.

FIG. 4 indicates the value of preheating and maintaining base metal temperature in the range above approximately 500° F. while the several layers of coating are applied.

What we claim as new and desired to be secured by Letters Patent of the United States is:

1. A method of coating a combustion chamber wall surface comprising the steps of preheating the base metal of said wall surface to at least 500° F., fusion bonding a base layer of nickel and aluminum to said preheated base metal, fusion bonding an intermediate layer of nickel, aluminum and copper to said base layer and fusion bonding an outer layer of copper to said intermediate layer.

2. The method of claim 1 including the step of quenching said coated wall surface after the application of said outer layer of copper.

3. The method of claim 2 wherein said quenching is accomplished with water when said coating and base metal are at least above 500° F.

4. The method of any of the preceding claims wherein said layers are applied by flame spraying and said base metal is maintained above 500° F. during the application of all of said layers.

5. The method of any of the preceding claims wherein said base layer is formed of a mixture of powdered metal comprising 95 percent nickel and 5 percent aluminum and is applied approximately 0.005 inch in thickness.

6. The method of any of the preceding claims wherein said intermediate layer is formed of a mixture having two parts, one part composed of a mixture of 95 percent nickel and 5 percent aluminum and the other part comprising powdered copper, said intermediate layer being applied approximately 0.005 inch in thickness.

7. The method of any of the preceding claims wherein said outer layer is applied in at least two passes of flame spraying with a thickness of approximately 0.005 inch.

8. The method of any of the preceding claims wherein said base metal wall surface is preheated and maintained at a temperature in the range of 600° F. to 1000° F. during application of said coating.

9. The method of claim 4 wherein each of said layers is applied with multiple passes of flame spraying.

10. In an internal combustion engine including a combustion chamber wall surface, the improvement comprising a multilayer coating fusion bonded to the base metal of said engine which forms said wall surface, said coating including an insulating base layer composed of nickel and aluminum for retarding heat transfer through said wall surface by conduction, an outer layer of copper for reflecting infrared heat radiation and an intermediate layer comprising a mixture of nickel, aluminum and copper for bonding said base layer and outer layer into an integral coating, said layers of said coating being fusion bonded together, thereby providing increased mechanical strength for resisting heat and abrasion developed in said chamber.

11. The improvement of claim 10 wherein said layers of said coating are approximately 0.005 inch in thickness.

12. The improvement of claim 10 wherein said base layer comprises approximately 95 percent nickel and 5 percent aluminum.

13. The improvement of claim 10 wherein said intermediate layer comprises a mixture of two parts, one part comprising 95 percent nickel and 5 percent aluminum, and the other part comprising copper.

14. The improvement of claim 13 wherein said one part comprises approximately 40 percent of the mixture.

15. The improvement of claim 13 wherein said one part comprises from 15 percent to 50 percent of the mixture and the other part makes up the remainder.

16. The improvement of claim 10 wherein said outer layer comprises substantially pure copper applied by flame spraying to a thickness in the range of 0.002 inch to 0.005 inch.